Figure 1:
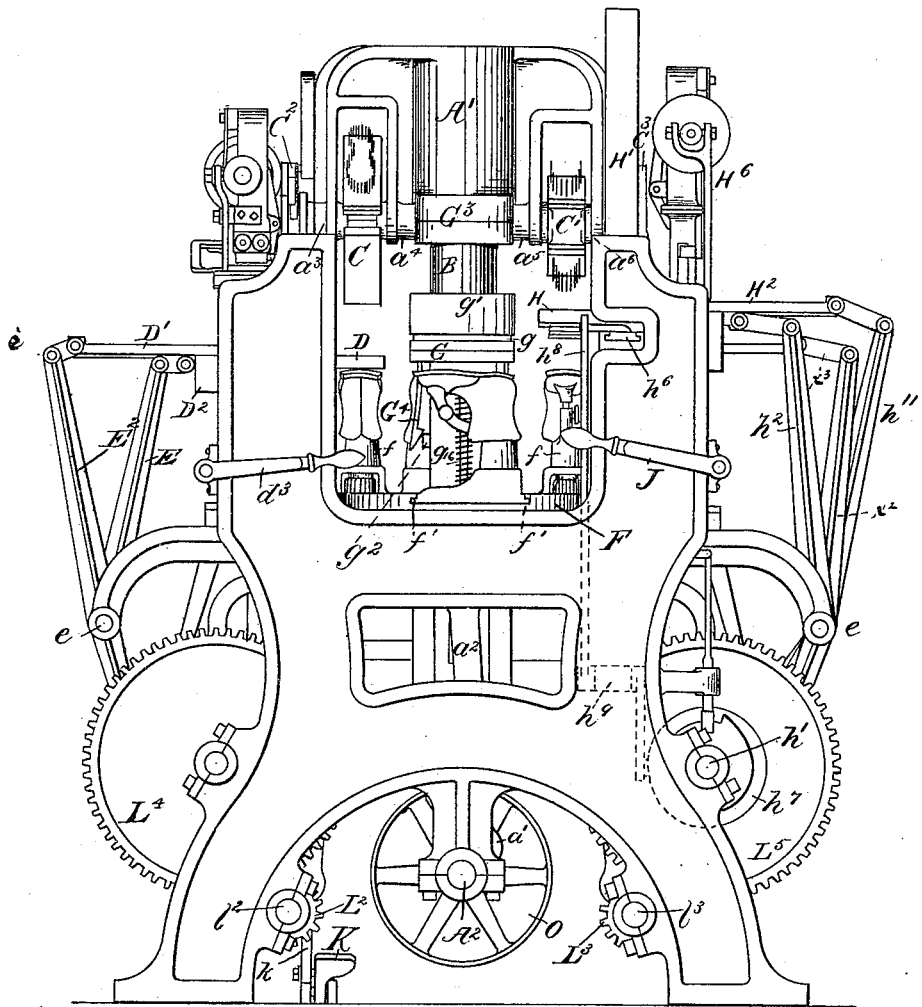

(No Model.) 13 Sheets—Sheet 1.

F. F. RAYMOND, 2d.
SOLE AND HEEL NAILING MACHINE.

No. 353,883. Patented Dec. 7, 1886.

(No Model.) 13 Sheets—Sheet 2.

F. F. RAYMOND, 2d.
SOLE AND HEEL NAILING MACHINE.

No. 353,883. Patented Dec. 7, 1886.

WITNESSES
J. Mc Dolan
Fred. B. Dolan

INVENTOR
F. F. Raymond

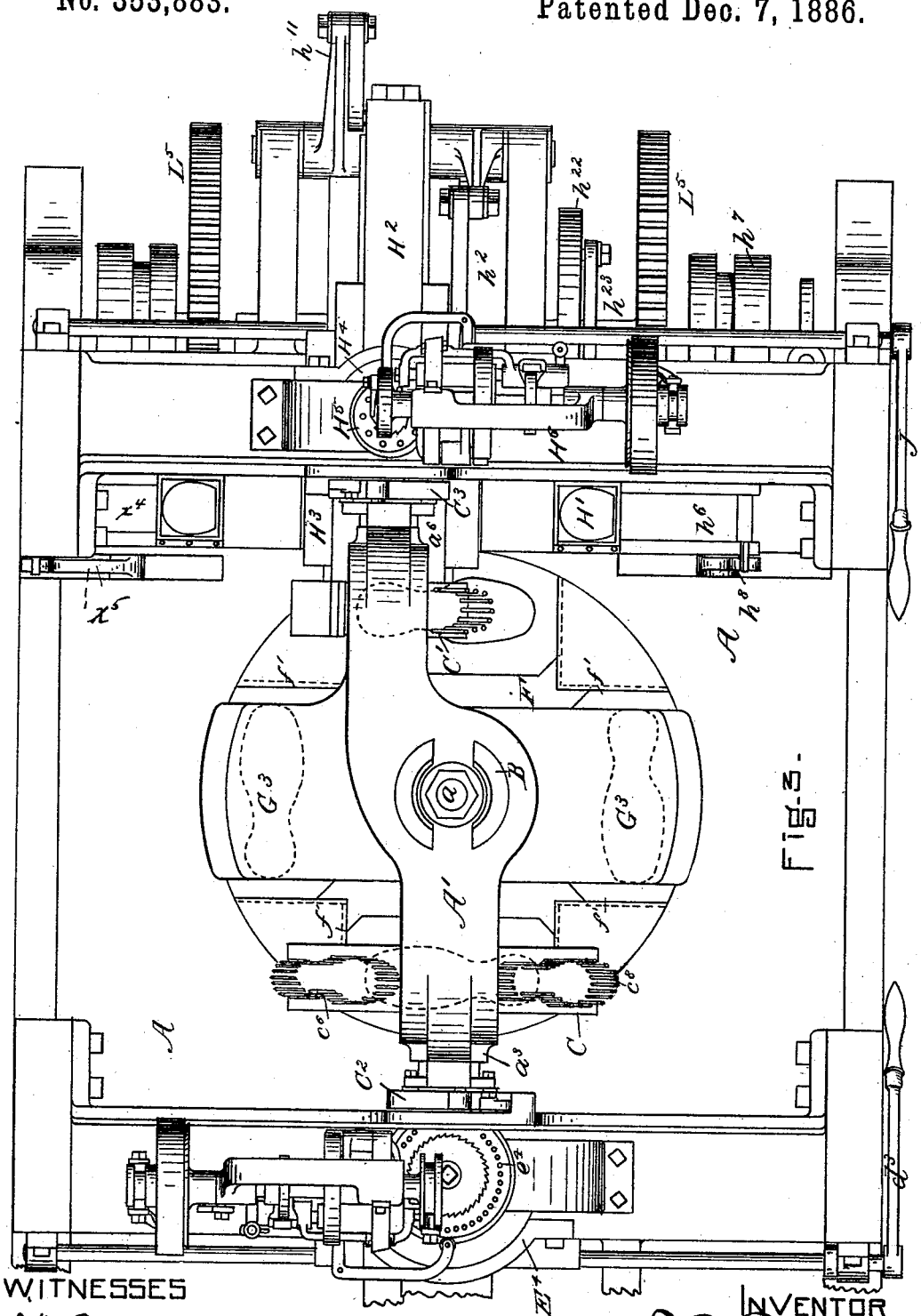

(No Model.)

F. F. RAYMOND, 2d.

SOLE AND HEEL NAILING MACHINE.

No. 353,883. Patented Dec. 7, 1886.

WITNESSES

INVENTOR (No Model.)  13 Sheets—Sheet 9.
F. F. RAYMOND, 2d.
SOLE AND HEEL NAILING MACHINE.
No. 353,883.  Patented Dec. 7, 1886.
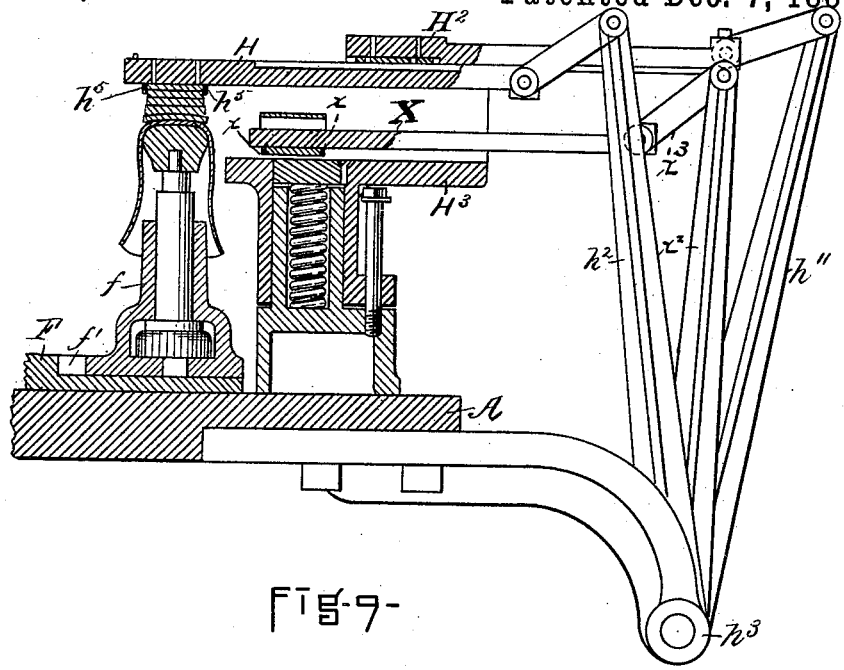
Fig. 9.
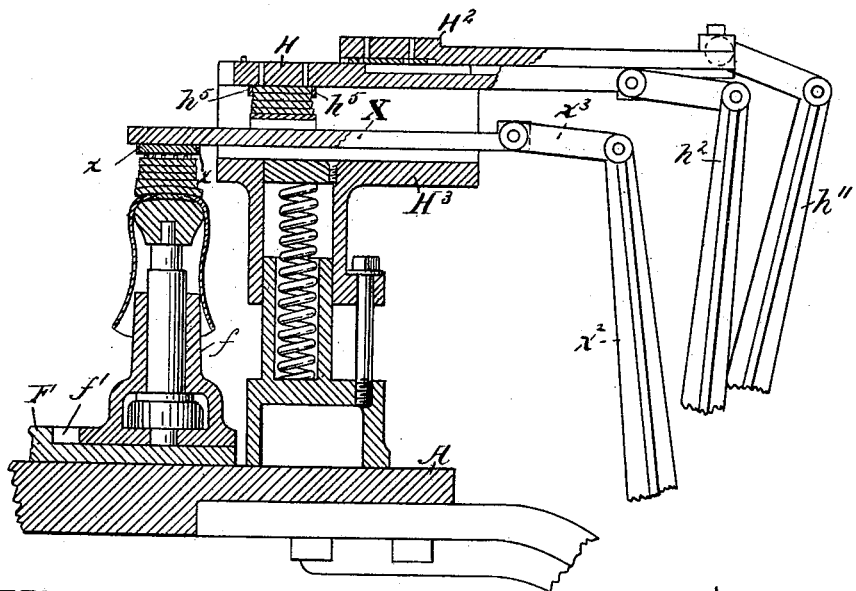
WITNESSES  Fig. 10  INVENTOR (No Model.)

F. F. RAYMOND, 2d.

SOLE AND HEEL NAILING MACHINE.

No. 353,883. Patented Dec. 7, 1886.

13 Sheets—Sheet 10.

WITNESSES
J. M. Dolan
Fred. B. Dolan

INVENTOR
F. F. Raymond 2d (No Model.)

F. F. RAYMOND, 2d.

SOLE AND HEEL NAILING MACHINE.

No. 353,883. Patented Dec. 7, 1886.

13 Sheets—Sheet 11.

WITNESSES

INVENTOR (No Model.) 13 Sheets—Sheet 12.

F. F. RAYMOND, 2d.
SOLE AND HEEL NAILING MACHINE.

No. 353,883. Patented Dec. 7, 1886.

WITNESSES
J. M. Dolan
Fred. B. Dolan

INVENTOR
F. F. Raymond (No Model.)  
F. F. RAYMOND, 2d.  
SOLE AND HEEL NAILING MACHINE.  
No. 353,883. Patented Dec. 7, 1886.

13 Sheets—Sheet 13.

WITNESSES  
INVENTOR

UNITED STATES PATENT OFFICE.

FREEBORN F. RAYMOND, 2D, OF NEWTON, MASSACHUSETTS.

SOLE AND HEEL NAILING MACHINE.

SPECIFICATION forming part of Letters Patent No. 353,883, dated December 7, 1886.

Application filed January 4, 1886. Serial No. 187,604. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Boot and Shoe Bottoming and Heeling Machines, of which the following is a full, clear, and exact description, reference being had to the accompanying drawings, forming a part of this specification, in explaining its nature.

The invention relates to an organized machine for attaching soles and heels to the inner soles and uppers of boots and shoes. It comprises devices for molding or forming the outsole to the shape of the bottom of the last or work-support, devices for nailing the sole to the upper and insole, devices for beating out or forming the sole after it has been secured to the insole, devices for attaching the heel-blank to the outer and inner sole, devices for breasting the heel, and devices for attaching the top lift. These devices or appliances preferably are so arranged in relation to each other that several of the operations are simultaneously proceeding on as many different boots or shoes.

The elements essential for this machine are as follows:

First. A movable table for transferring the jacks or last-supports in succession to the various appliances.

Second. A sole-forming mold adapted to give shape to the outer sole before it is attached to the insole of the boot or shoe. This plate may be the pressure or templet plate through which the sole-attaching fastenings are driven, or it may be a separate device adapted to be operated as hereinafter specified. I prefer, however, for reasons hereinafter given, to combine it with the templet or pressure plate.

Third. A templet or pressure plate having a cavity or mold of the shape which it is desired that the outsole shall have, and also a movement to and from the jack or work-support, and holes arranged to open into the cavity through which the sole-fastenings are driven.

Fourth. Devices for automatically feeding the attaching-nails in proper order for simultaneous driving to the holes in the templet or pressure plate.

Fifth. A reciprocating pressure-block, a reciprocating gang or group of awls, and a reciprocating gang or group of drivers adapted to be automatically brought into operation and successively operated.

Sixth. A beating-out form or mold adapted to be moved upon the outside of the boot or shoe after it has been attached, and, if desired, to be held locked thereon under pressure while the sole and heel attaching devices are being operated to attach a sole and heel to other boots or shoes.

Seventh. Devices for automatically feeding a heel-blank into position to be attached, and, if a top lift is used, for automatically feeding the top lift also.

Eighth. Devices for compressing the heel-blank upon the attached sole of the boot or shoe and for holding it compressed during the heel-attaching operation.

Ninth. Devices for automatically transferring the heel-attaching nails from an automatic feeding device to the holes in the pressure-plate.

Tenth. A reciprocating gang or group of awls, a reciprocating gang or group of drivers, a reciprocating pressure-block, and a reciprocating breasting-knife adapted to be brought successively into position and operated to attach and breast the heel.

Eleventh. Devices for automatically feeding the sole-fastenings to the nail or fastening carrier plate of the sole-fastening device, and for automatically supplying the heel-nails to the carrier of the heel-attaching device.

Figures 2, 19:
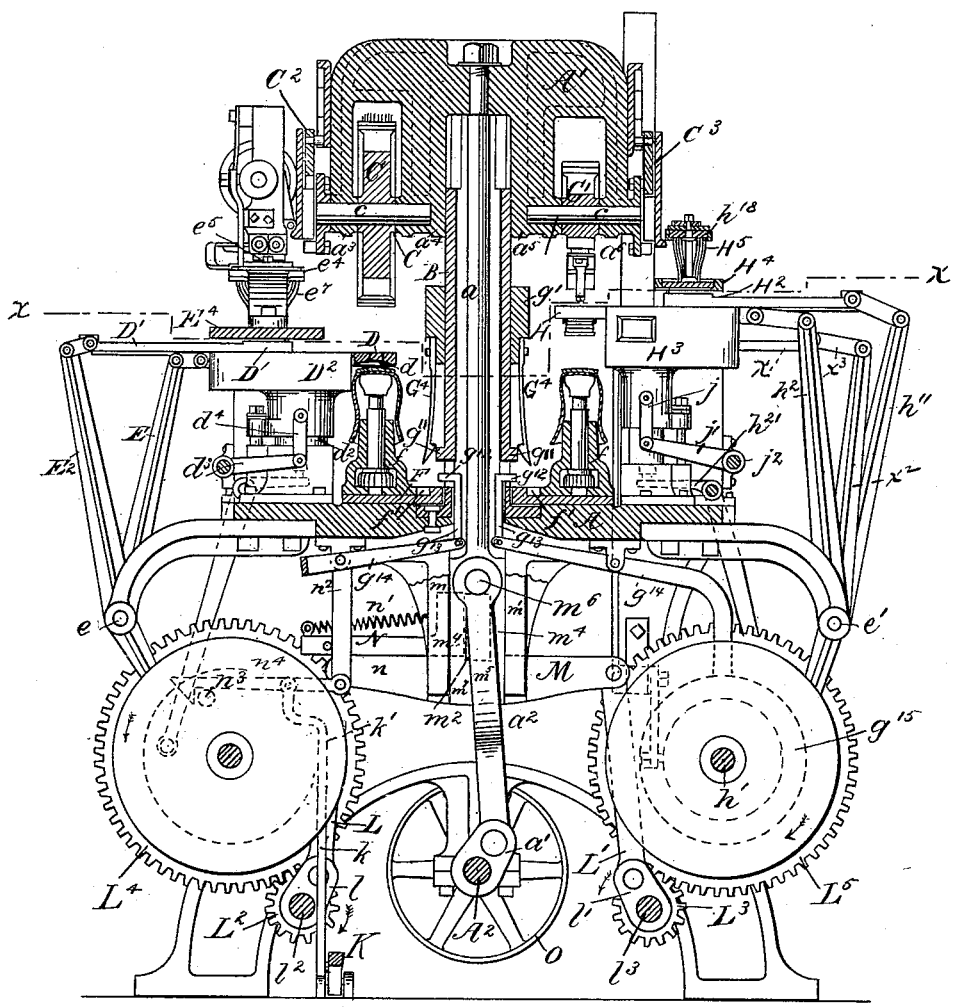
Figure 4:
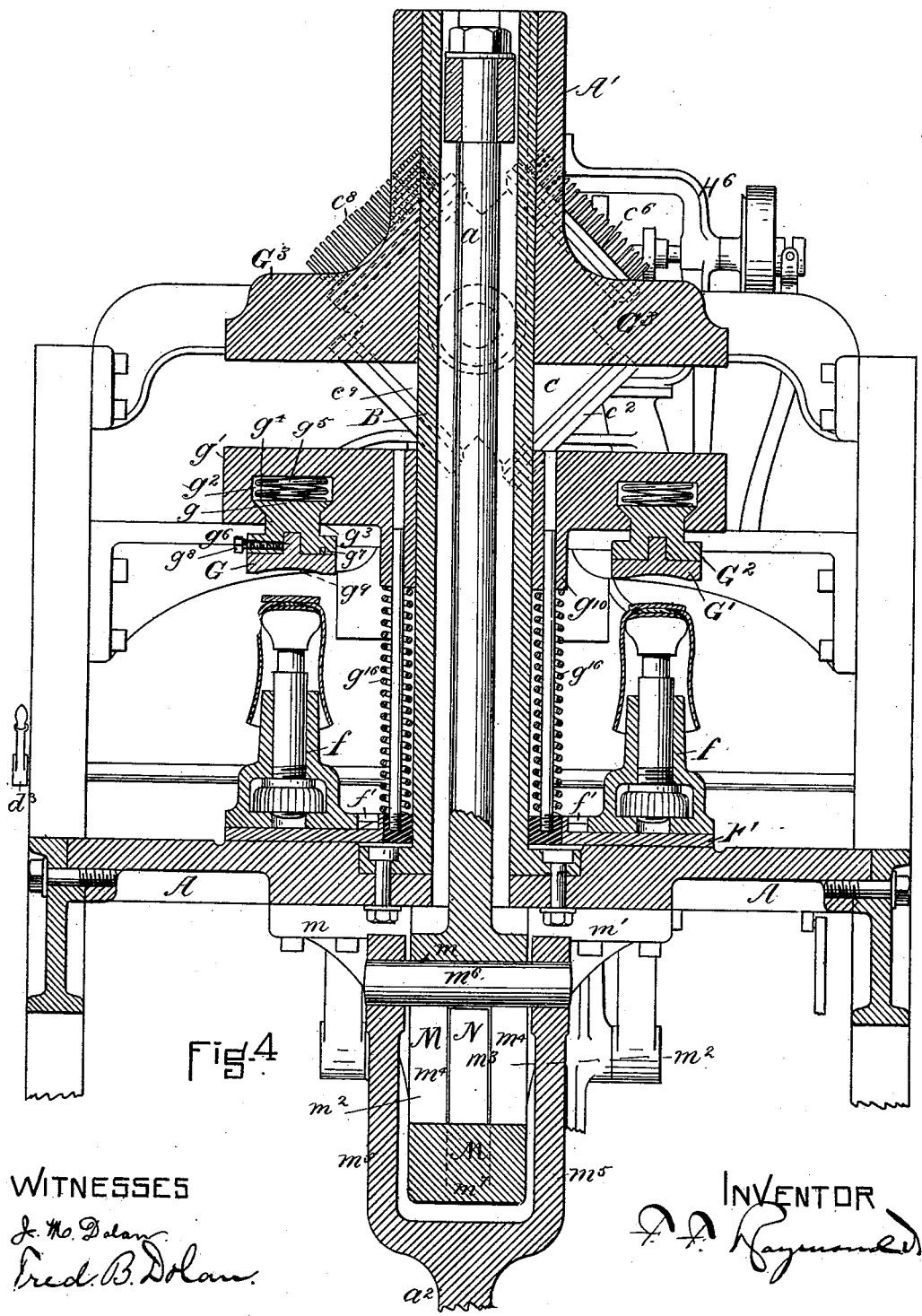
Figure 5:
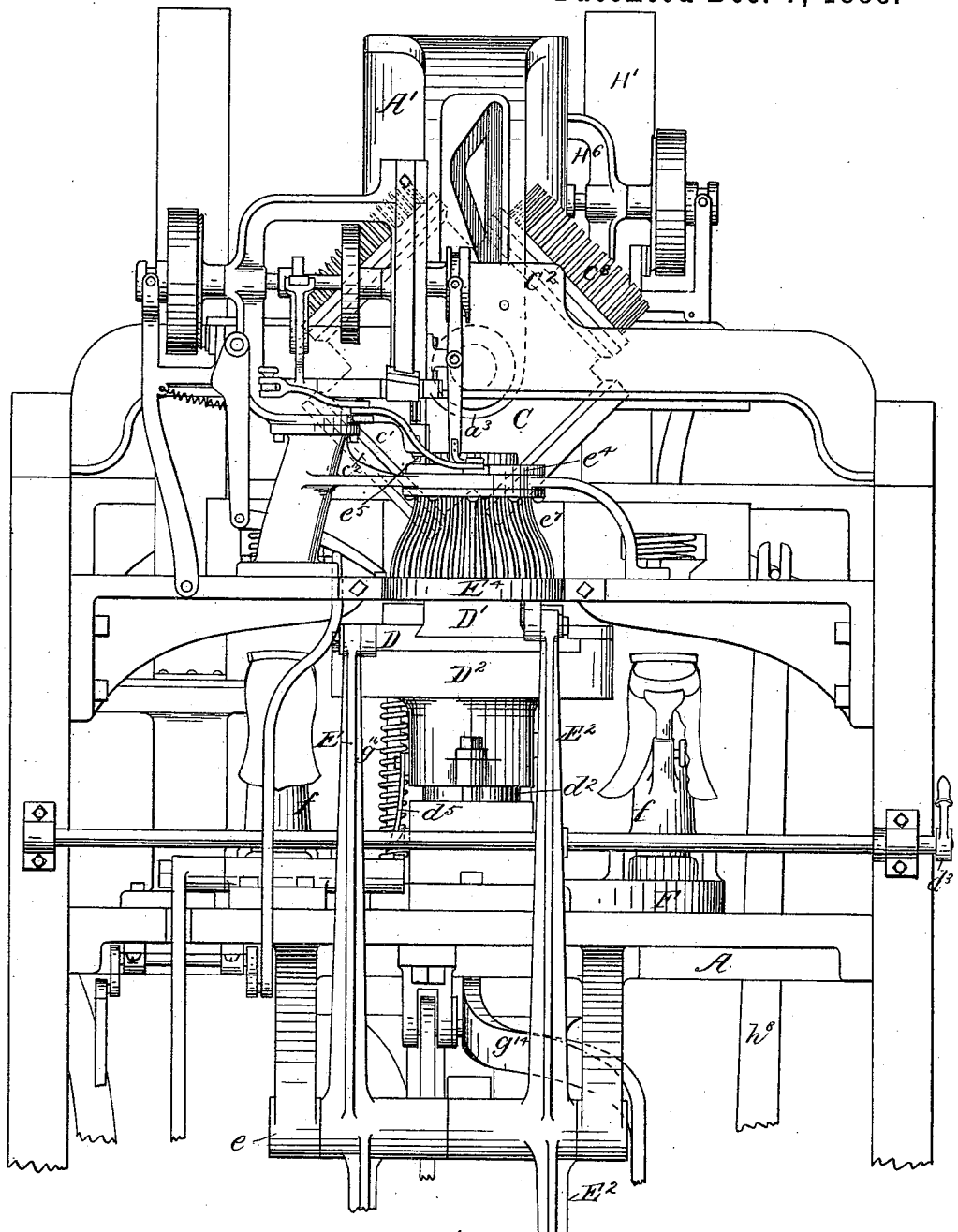
Figure 6:
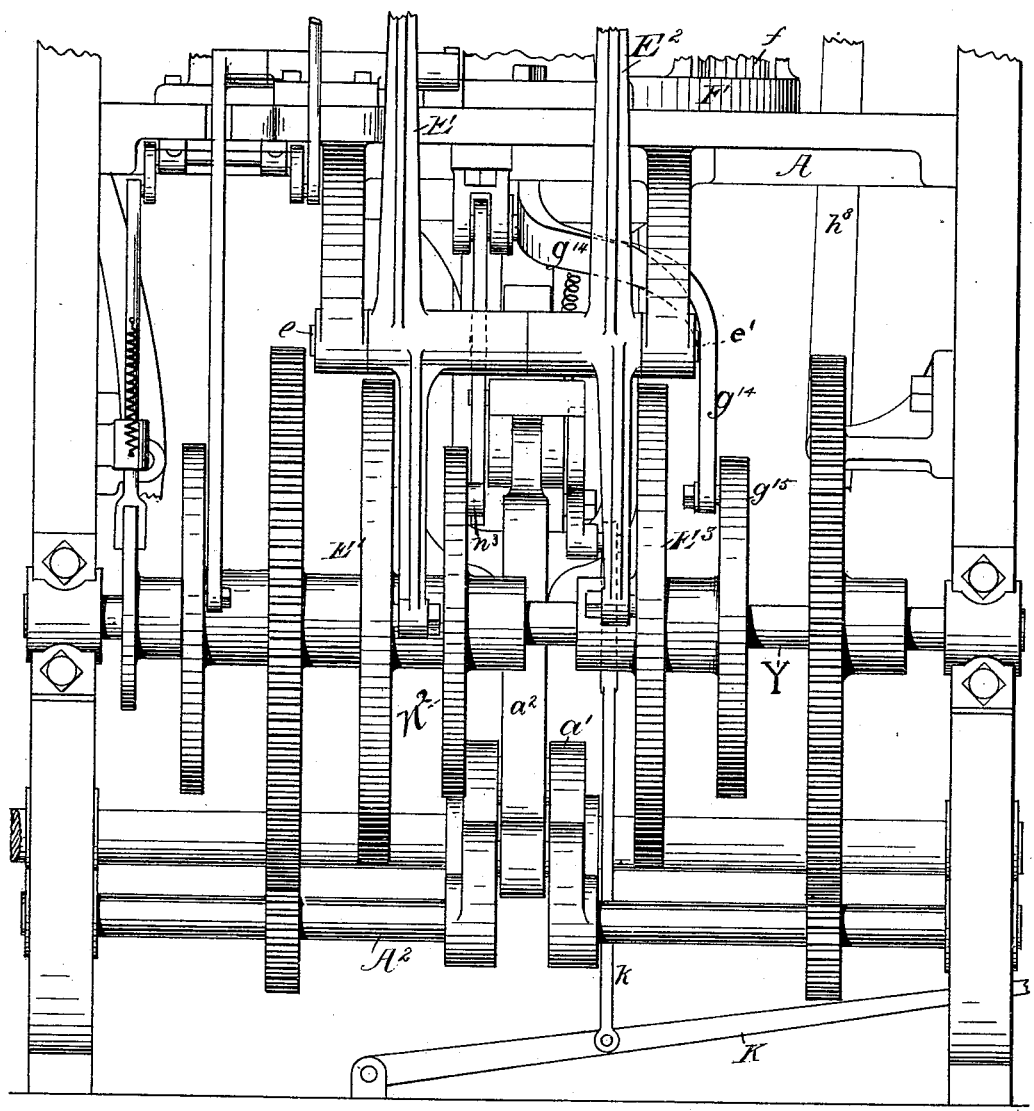
Figure 7:
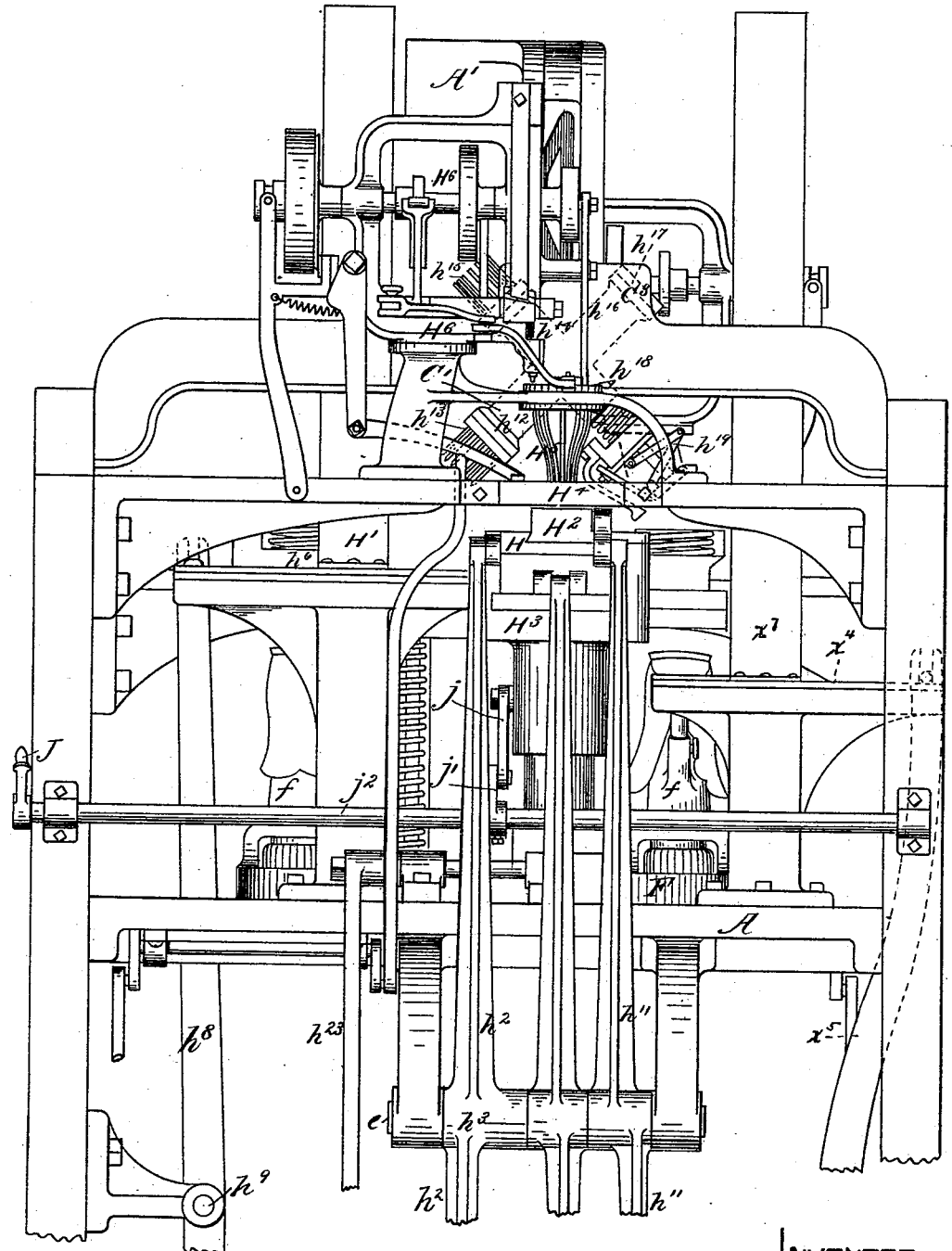
Figure 8:
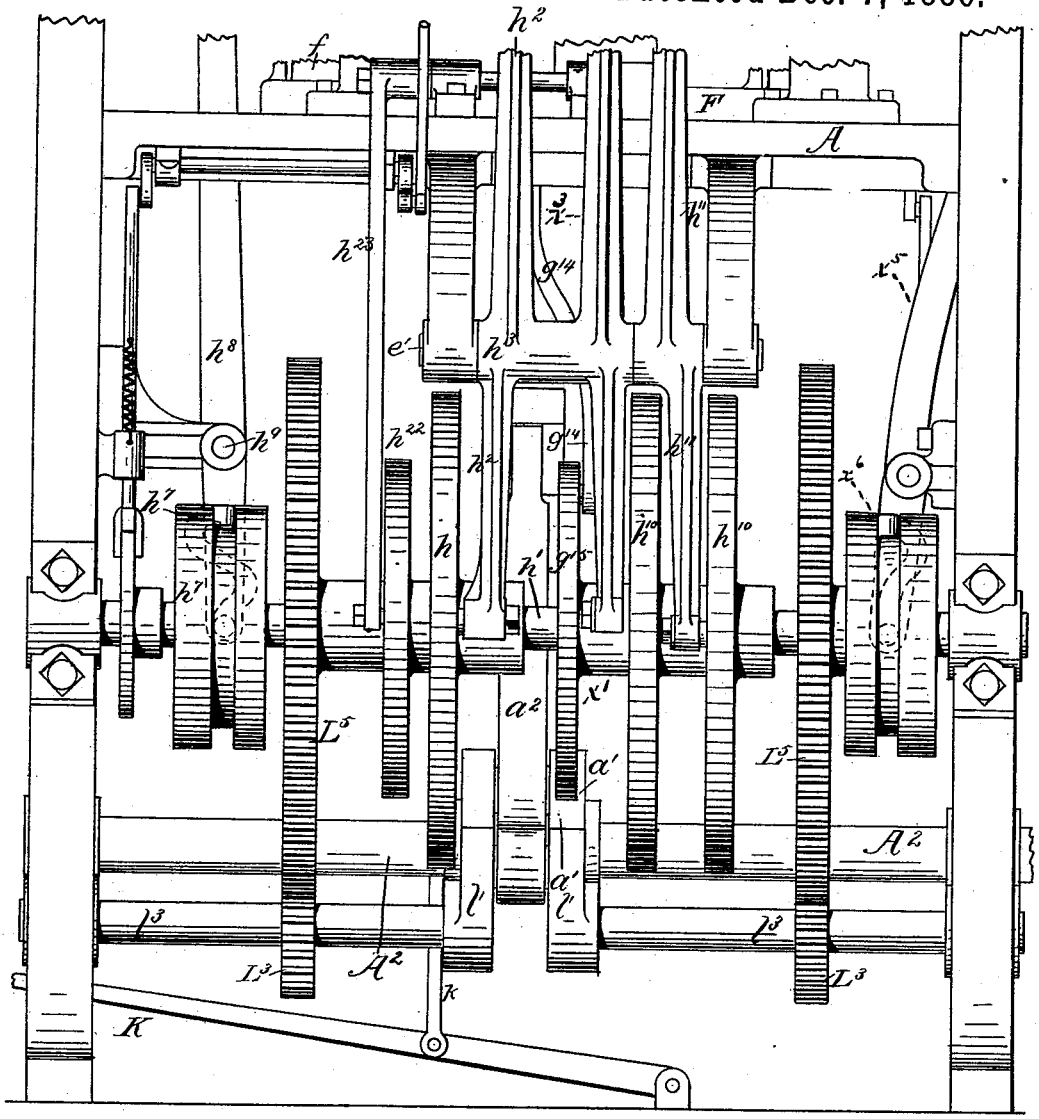
Figure 11:
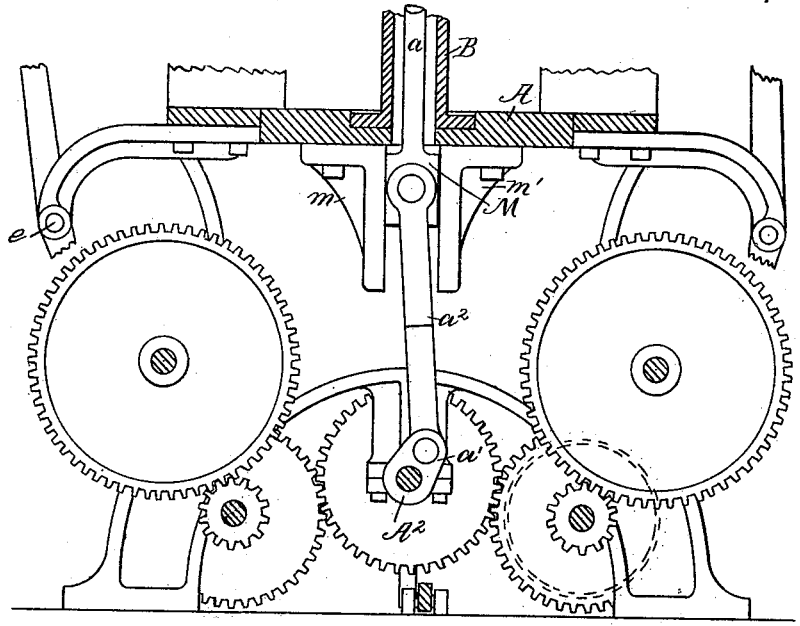
Figure 12:
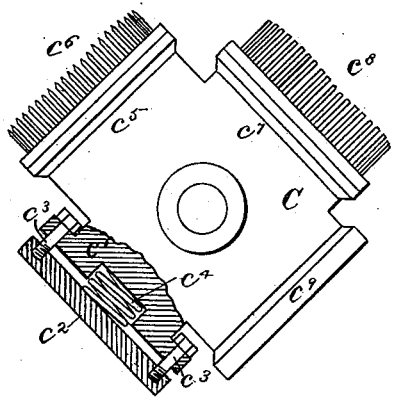
Figure 13:
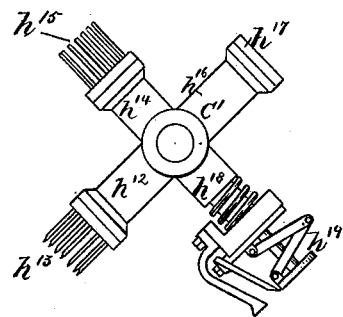
Figure 14:
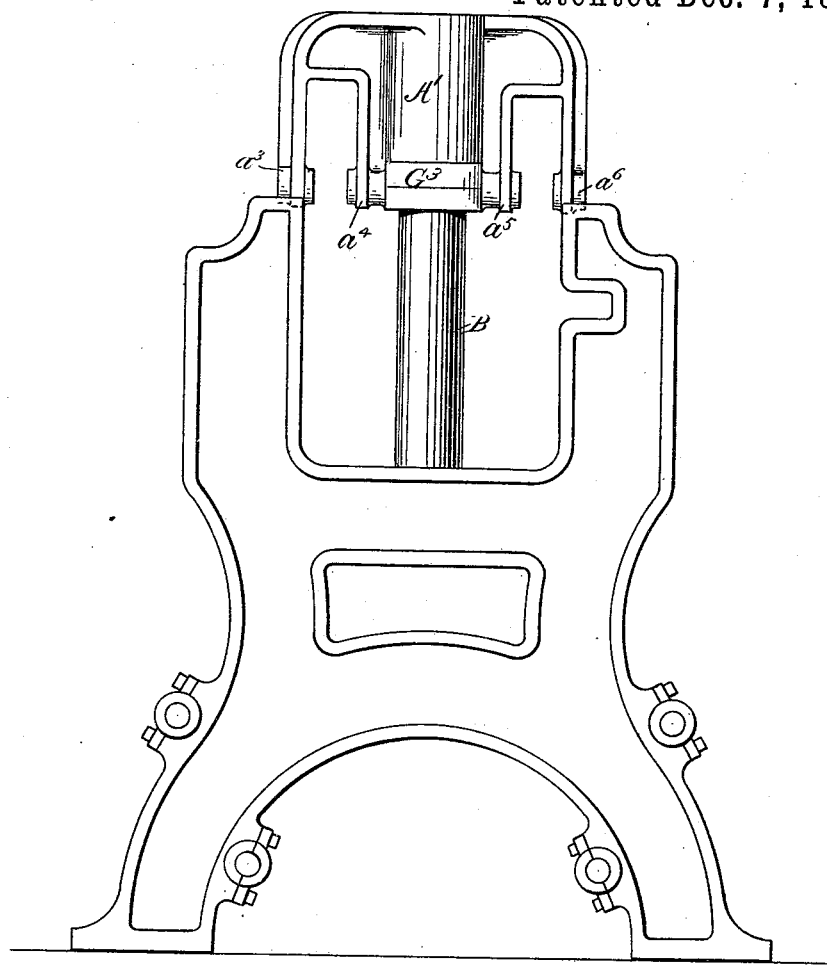
Figures 15, 16:
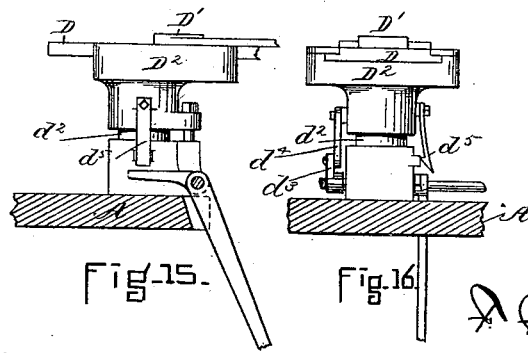
Figure 17:
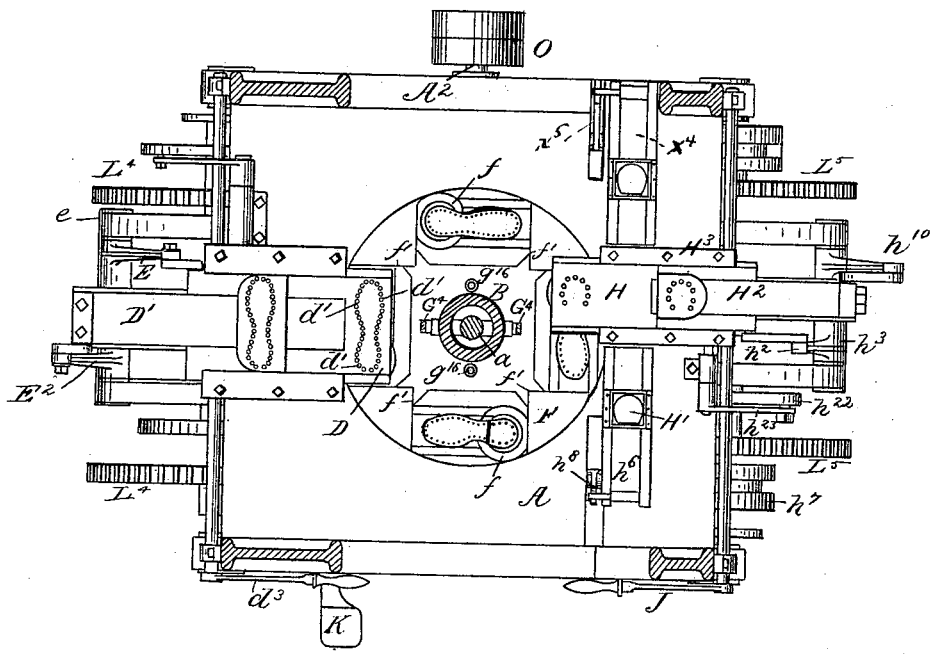
Figure 18:
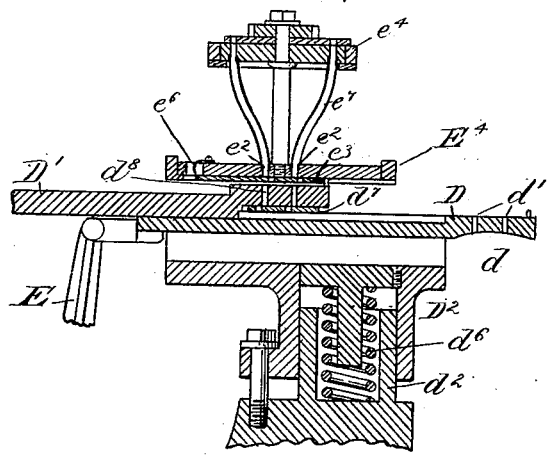
Figure 20:
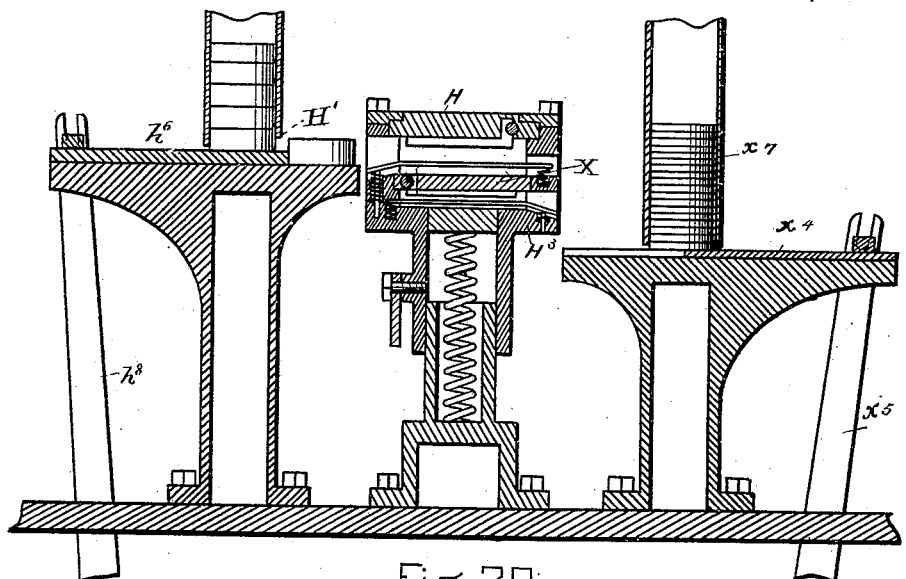
Figure 21:
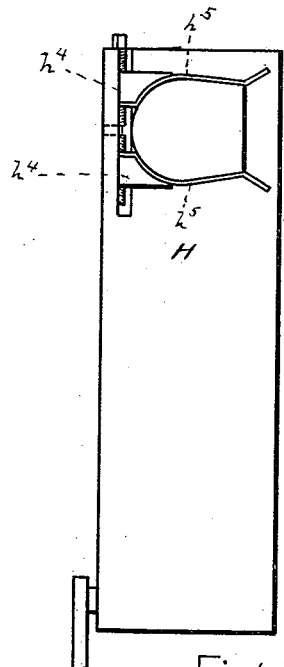
Figure 22:
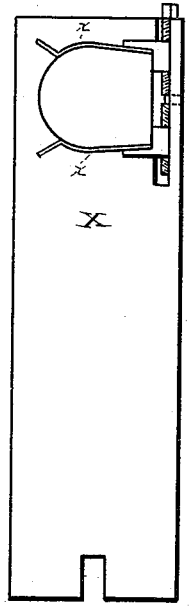

Referring to the drawings, Figure 1 is a front elevation of a machine containing the features of my invention. Fig. 2 is a view, part in vertical central section and part in elevation, further illustrating its construction and operation. Fig. 3 is a plan view of this machine enlarged. Fig. 4 is a vertical section of the central and upper parts of the machine from front to rear enlarged. Fig. 5 is a right side elevation of the central and upper parts of the machine. Fig. 6 is a right side elevation of the central and lower parts of the machine enlarged. Fig. 7 is a left side elevation of the central and upper parts of the machine enlarged. Fig. 8 is a view in left side elevation of the central and lower parts of the machine enlarged. Figs. 9 and 10 represent in vertical section portions of the heel-blank and top-lift-feeding devices. Fig. 11 is a view of a modification, hereinafter described. Fig. 12 is a view in elevation and section of a sole-nailing revolving head. Fig. 13 is an elevation of the heel-nailing revolving head. Fig. 14 is a view in elevation of the frame of the machine and of the cross-head. Figs. 15 and 16 are detail views representing the table latching and unlatching mechanism. Fig. 17 is a view in section and plan upon and below the dotted line $x\ x$ of Fig. 2. Fig. 18 is a view in vertical section of a portion of the sole-nailing devices. Fig. 19 is a view in rear elevation of a portion of the heel-blank and top-lift feeding devices and table moving, latching, and unlatching mechanism. Fig. 20 is a vertical section through the top-lift-feeding devices and heel-blank, representing their construction and the relation which they bear to the templet-plate and the mechanism for supporting it. Fig. 21 is a plan view of the templet-plate inverted, showing the heel-blank-grasping devices. Fig. 22 is a plan view of the top-lift-feeding plate inverted, showing the top-lift-grasping devices.

A is the bed of the machine. B is a strong column extending upward therefrom and fastened thereto. A' is a cross-head, arranged to fit the column B, and reciprocated thereon by means of the rod $a$, the crank $a'$ on the main shaft $A^2$, and the connecting-pitman $a^2$.

The cross-head A' carries or supports the two revolving heads C C'. These preferably are arranged upon opposite sides of the column B and upon the shafts $c$, which have bearings in the portions $a^3$, $a^4$, $a^5$, and $a^6$ of the head A'. The revolving head C carries appliances which are used in connection with the sole-attaching devices, and the revolving head C' the appliances which are used in connection with the heel-attaching devices. The heads are automatically revolved by means of the mechanism described in the Patent No. 317,647, and I may use this revolving or turning mechanism in connection with each head, as represented in the drawings. $C^2$ and $C^3$ represent the locations of these portions of the machine.

The revolving head C has preferably four arms, the first of which, or the arm $c'$, is arranged to support the pressure-block $c^2$, which is adapted to be brought in contact with the upper surface of the pressure plate or templet D, upon its downward movement, to force it upon the outsole. This pressure-block $c^2$ is secured to the arm $c'$ in a manner to permit a slight yielding movement in relation thereto against the pressure of a powerful spring, and I have represented in Fig. 12 the construction which I prefer to employ, $c^3$ being bolts which act as guide and attaching pins, and $c^4$ being the spring. The arm $c^5$ supports or carries the awl-holding block $c^6$. The arm $c^7$ holds or supports the driver-holding block $c^8$, and the arm $c^9$ is used to balance the arm $c^5$.

The templet or pressure plate D has a cavity, $d$, which is shaped to a form to correspond with the shape of the bottom of the last or support, and of course this is shaped to provide the outsole with the form which it is desired it should have. There are arranged in this plate the holes $d'$, which open into the cavity $d$, and are made a uniform distance apart, and so as to place or locate the fastenings at a proper distance from the edge of the sole. This templet or pressure plate D, as well as the nail-carrier plate D', is mounted upon the carriage $D^2$, which is vertically movable upon the post $d^2$, the carriage being moved downward by the lever $d^3$ and link $d^4$, and by the pressure-block $c^2$, and then locked in that position by the latch $d^5$, and upward after the latch has been released by means of the spring $d^6$.

The nail-carrier D' has a sliding bottom plate, $d^7$, provided with perforations which correspond in size and order with the perforations $d^8$ in the nail-carrier, and this thin bottom plate is adapted to slide upon the carrier-plate D', to close and open the holes therein. It is automatically moved to open the holes substantially as described in the Henderson Patent No. 316,894, upon the movement of the nail-carrier into place over the templet or pressure plate to discharge its nails into the holes $d'$, and it is automatically closed by a spring upon the reverse movement of the carrier.

The templet-plate D may be moved horizontally into and out of operative position, if desired, although it is immaterial whether it be so moved. I have represented it in the drawings, however, as moved by the lever E, which is pivoted at $e$, and the cam E', on the shaft Y, and the nail-carrier is moved automatically into and out of operative position by means of the lever $E^2$, pivoted at $e'$, and the cam $E^3$. The sole-fastenings are arranged for automatic delivery to the nail-carrier in the nail-holder $E^4$. This nail-holder has the holes $e^2$, which correspond in number and arrangement with the holes in the nail-carrier D', and it also has a sliding perforated plate, $e^3$, which is moved by the nail-carrier D' to open the holes in the nail-holder when the holes in the nail-carrier are brought in line therewith, and it is closed automatically by the spring $e^6$. The holes of the nail-holder are connected by tubes $e^7$ with the holes in the distributer $e^4$, and the holes in the distributer are automatically brought in successive order beneath the throat $e^5$ of a nail making or feeding device.

In the drawings I have represented generally, but not in detail, a nail-making device for making nails successively from wire, and as the device does not vary in any material respect from that described in my Letters Patent No. 317,199, it is unnecessary for me to again describe it here. I will state, however, that it is desirable that the automatic device for varying the lengths of the nails described in said patent, as well as in my Patent No. 325,272, be used.

F is the revolving table. It is represented as supporting four jacks or work-supports, $f$, and these work-supports are arranged to slide radially thereon in guides $f'$. This table and the jacks or work-supports are arranged so that the boot or shoe is first fed to the sole-forming and sole-attaching devices, from thence advanced to the beating-out form, and then to the heel-attaching appliances, and then to its original position, where the boot or shoe is removed by the operator, entirely bottomed, with the heel attached, and an unbottomed boot or shoe substituted therefor. Of course as a boot or shoe is advanced from one operative device to another, it brings into position two or three other boots or shoes, as there are always three or four boots or shoes which are being operated upon simultaneously.

G is the beating-form. It preferably is supported by the block $g$, which is carried by the vertically-movable plate or support $g'$. The block $g$ is preferably attached to the plate $g'$, to yield slightly when it is desired to relieve the sole from excessive pressure, and this is accomplished by means of the recess $g^2$, which extends upward from the opening $g^3$, and receives the upper portion of the block $g$, which preferably has a dovetail, $g^4$, which fits the under portion of the recess, and between the upper surface of the block and the surface which forms the upper wall of the recess there is arranged a powerful spring, $g^5$, which bears constantly against the block $g$.

The beating-out form G is attached to the block $g$ in a manner to be removed therefrom, preferably by means of the stud $g^6$, dowel-pin $g^7$, and locking-screw $g^8$. It has a cavity or form, $g^9$, which gives the ultimate form or shape to the outsole. The plate $g'$, preferably, is supported by the column B, and it has a sleeve, $g^{10}$, which extends downward about the same, and when the outsole is molded by a device independent of the templet or pressure plate of the sole-attaching device I extend this table $g'$ from the opposite side of the post B and provide it with the sole-molding form G', which is mounted upon the yielding block $G^2$ in the same way that the beating-out form G is mounted. The plate $g'$ is moved vertically downward by means of the pressure block or blocks $G^3$, carried by the head A', one of said blocks $G^3$ coming in contact with the upper surface of the plate $g'$ and moving it vertically downward. When the beating-out form only is used, there is only one pressure-block $G^3$.

Upon the first reciprocation of the head the plate $g'$ is moved downward and forces the beating-out block with great pressure upon the attached outsole. It is then automatically locked by the latches $G^4$, the beating-out form or block being held upon the outsole, and it remains so locked while the head A' is making the three additional reciprocations necessary for attaching the heel and breasting it. The latches $G^4$ close upon the stationary blocks $g^{11}$, and are then unlatched by means of the unlatching blocks or devices $g^{12}$, which are moved vertically upward against the inclined surfaces of the latches by means of the rods or bars $g^{13}$, to the upper end of which they are attached, and the levers $g^{14}$, which are operated by the cams $g^{15}$ upon the cam-shafts, and upon the release of the latches $G^4$ the springs $g^{16}$ automatically move the plate $g'$ upward. The boot or shoe, the sole having been secured thereto, having been submitted to the beating-out device, and the sole having been shaped thereby, is then advanced to the heel-attaching devices, and the heel-blank is fed or moved automatically into position for attachment by the templet-plate H, which is moved or reciprocated by means of the cam $h$ upon the cam-shaft $h'$ and the lever $h^2$, pivoted at $h^3$. This templet-plate carries or supports a heel-blank-holding device, which comprises, essentially, the gage-plates $h^4$ and the yielding side jaws, $h^5$. These holding devices are adapted, when their supporting-plate H is in proper position and at the proper interval, to receive a heel-blank from the stack of heel-blocks H'. The heel-blanks are fed in successive order thereto from the stack by means of the sliding or reciprocating plate $h^6$, which is operated by the cam $h^7$ and lever $h^8$, pivoted at $h^9$ to be moved across the bottom of the box holding the stack of heel-blanks, and to take therefrom one heel-blank and transfer it to the heel-blank holding arms or the templet-plate.

The top lifts are automatically fed into position over the attached heel-blank by means of the plate X, arranged to slide in the carriage or table $H^3$ below the templet-plate. It carries the top-lift-grasping arms $x$, which are like those of the Henderson Patent No. 316,894, and they are arranged to receive the top lift and hold the same. The plate X is moved by the cam $x'$, lever $x^2$, and link $x^3$. The top lift is fed to the arms $x$, when the plate is in the position shown in Fig. 9, by means of the plate $x^4$, the lever $x^5$, and arms $x^6$. The top lifts are held on the stack $x^7$, and the plate $x^4$ is reciprocated at suitable intervals across the bottom thereof to remove the undermost top lift therefrom and transfer it therefrom through a hole in the side of the table or carriage $H^3$ to the top-lift-holding arms on the plate X, and, after the top lift has been spanked on the plate, is immediately drawn back to bring the heel-blank and top-lift-holding devices in place to receive another heel-blank and top lift.

The templet or pressure plate has the holes through which the attaching-nails are driven, and it and the nail-carrier $H^2$ are mounted on the vertically-movable table $H^3$. The carrier $H^2$ is similar in construction to the carrier D', the only difference being that the holes are arranged to conform to the shape of the heel instead of to the sole, and it receives its nails from the holder $H^4$, which is similar in construction to that of the holder $E^4$, and is adapted to receive and hold its nails in the same manner as said holder $E^4$.

$H^5$ is the nail-distributer, and $H^6$ the nail-making devices, which are like those used for making the sole-nail fastenings, the only difference being that they are adapted to make a longer and larger nail. The nail-carrier plate is moved horizontally by the cam $h^{10}$ and lever $h^{11}$. It and the templet or pressure plate H are moved out of position immediately after the drivers have been reciprocated and before the spanker-block, hereinafter described, has been brought into operation.

The revolving head C' has four arms, the first of which—the arm $h^{12}$—carries or supports a block holding a gang or group of awls, $h^{13}$; the second—the arm $h^{14}$—carries or supports a block holding a gang or group of drivers $h^{15}$; the third—arm $h^{16}$—carries or supports the spanker-block $h^{17}$, and the fourth—arm $h^{18}$—carries or supports the heel-breasting device $h^{19}$, which is like that described in my Letters Patent No. 316,177.

The revolving head is automatically turned or revolved to bring each of the arms into a vertical position over the work, and upon the first reciprocation of the head A' the holes are formed in the heel. Upon the second reciprocation thereof the nails are driven; upon a third reciprocation the top lift spanked on, the spanker-block coming in contact with the upper surface of the plate X, and upon a fourth reciprocation of the head the heel is breasted.

The pressure or templet plate H is locked at the end of its downward movement by means of the latch $h^{20}$, and it is automatically unlatched to permit the spring to lift the carriage upward after the drivers have been reciprocated by means of the unlatching-arm $h^{21}$, which is operated by the cam $h^{22}$ and lever $h^{23}$. The table is then revolved to bring the next boot or shoe into position to receive the heel, and the operator removes the finished boot or shoe and brings an unsoled one in its place. The pressure-plate H is moved down upon the heel-blank by the operator before the awls are reciprocated, by means of the lever J, which is connected with the carriage $H^3$ by the link $j$, the arm $j'$, and the shaft $j^2$.

It is desirable that the power or means for reciprocating the head A' be brought as near it as possible and that it be kept in continuous motion, in order that the advantage which arises from the momentum of the machine and from starting as small a section as possible may be obtained, and this result I have attained by connecting the rod $a$ with the block M, which is arranged to slide in ways in the brackets $m\ m'$. This block M has the slot $m^2$ extending across it from side to side, and also the space $m^3$ between its two parts $m^4$. (See Fig. 4.) The pitman $a^2$ has the arms $m^5$, which extend upward on either side of the block M, and they carry the large pin $m^6$, which extends across the slot $m^2$ and moves vertically therein, except when it is desired to reciprocate the head A'. As the crank $a'$ has a constant rotation, the pitman, of course, moves constantly up and down. To reciprocate the head A', I have arranged the block N upon the plate carried by the block M, and when it is desired to reciprocate the head A' the block N is moved inward upon its plate, so as to be interposed between the pin or cross-piece $m^6$ of the reciprocating pitman $a^2$ and the cross-piece $m^7$ of the block M. Consequently, when it is so placed the cross-head A' is drawn down a distance equivalent to the thickness of the block. The block is moved into position in any desirable way, and I have illustrated two ways. One is by means of the coil-spring $n'$, which, upon the release of the lever $n^2$, draws the block, when the pin $m^6$ is in its highest position, between it and the cross-piece $m^7$. The block is automatically moved out of position after one or more reciprocations of the head A' by means of the pin $n^3$ and the latch $n^4$, which is shaped at its end substantially as described, so that the pin which is borne by the cam-disk $N^2$ upon being brought into contact with the end of the latch moves the upper end of the lever $n^2$ outward, and therefore the block N, and of course as the block N is moved outward the machine immediately comes to rest, the block N being withdrawn only enough to allow the pin $m^6$ to continue its reciprocation, and it then acts to hold the cross-head A' in its elevated position, the front portion of the block M resting upon the upper surface of the block N.

In the drawings I have represented the device for automatically withdrawing the block N, as called into operation upon the fourth reciprocation of the cross-head A', so that the machine after it has started makes four reciprocations of the cross-head before it is stopped.

To start the machine, the treadle K is depressed. This causes the rod $k$ to release the latch $n^4$, which releases the lever $n^2$ and allows the spring $n'$ to bring the block N under the pin $m^6$. The height of the block N should be somewhat less than the vertical distance between the under surface of the slot $m^2$ when in its highest position and of the upper surface of the cross-piece $m^7$, in order that the block N may be readily moved into place when the pin $m^6$ is in its highest position; and it is desirable that the block N should be moved in from the side of the block M, which shall bring the inward movement in the same direction as that of the partially-revolving movement of the pin $m^6$ upon the downward movement, as this revolving movement of the pin upon the surface of the block N will act to hold the block rigidly in place. This partially-revolving movement is caused, of course, by the movement which is given to the pitman by the crank. Upon the upward movement of the pitman the pin $m^6$ does not bear, of course, upon the block N, but upon the surface $m$ of the block M, so that the block can readily be removed at any point of the upward movement of the cross-head A'. As the crank $a'$ and the pitman are constantly reciprocating, it is obvious that the cam-shafts cannot be revolved directly from the main shaft $A^2$, and, in order to provide these shafts with the proper movement at the necessary time or intervals, I take the movement for turning or revolving them from the block M, and I connect the block M with the cam-shafts by means of the connecting-rods L L', which are pivoted at their upper ends to the block M, the cranks $l$ $l'$ upon the shafts $l^2$ $l^3$, and the pinions $L^2$ $L^3$, which engage with the gears $L^4$ $L^5$, upon the cam-shafts. By this construction one complete reciprocation of the block M revolves the pinion-shafts $l^2$ $l^3$, and the pinions bear such relation as to size to the gears as may be required. In the invention as described, the pinions make four revolutions to every revolution of the cam-shaft.

It will be seen from the above description that the vertically-movable block M, at the lower end of the rod $a$, is only reciprocated when the sliding block N has been released by the treadle, and that the pitman $a^2$ and its cross-pin $m^6$ are constantly reciprocated in a vertical slot in the said block M, and that in order to obtain a reciprocation of the cross-head A' the sliding block N is moved inward upon the plate $n$, projecting from the block M into position beneath the rod $a$, and while the pin $m^6$ is upon the upper part of its reciprocation, and that the block N remains in place between the pitman-pin $m^6$ and the lower part of the block M until it is positively withdrawn by a pin, $n^3$, attached to the cam-disk $N^2$. When the block N is thus withdrawn, the machine, of course, comes to rest and cannot again be started until the latch has been disengaged from the pin $n^3$.

O is the pulley. It is represented as upon the crank-shaft $A^2$; and there may also be used in addition a fly-wheel, if desired, or the pulley may be on a counter-shaft connected with the crank-shaft by means of suitable gearing. (See Fig. 11.)

The devices for making the sole and heel nails are operated by belts running to suitable shafts. In other words they are not run by the main shaft of the heel-attaching machine. This construction is necessary, because the nail-making devices must continue to operate after the sole and heel have been attached, and they generally run from two to six or eight seconds after the completion of the sole nailing and heel attaching. They are automatically set in operation, however, by the main machine, as described in my Patent No. 317,199, dated May 5, 1885, and they are also automatically stopped after a suitable number of fastenings have been made, as described in my said patent.

To operate the machine, the operator takes a position opposite the sole-molding devices, if separate sole-molding devices be employed, and if not opposite the place which they would occupy. He places an unsoled boot or shoe upon the jack or work-support which is before him, and he then, if the sole is not formed prior to the operation of the sole-attaching devices, moves the jack and work to a position under the pressure-plate D, and he then places the outsole in position upon the insole, if he has not already done so or if it has not been previously tacked on, and by the lever $d^3$ moves the plate down upon the outsole. The machine is then set in operation and the first reciprocation causes the plate D to be clamped with considerable pressure upon the outsole. The next reciprocation forms the awl-holes in the outsole and the third drives the sole-fastenings, and while the machine is thus operating the operator is placing a second unsoled shoe upon the second jack, and as soon as the outer sole of the first shoe is attached he moves the table F and brings the first shoe or the shoe which has had the sole attached under the beating-out form while the second unsoled shoe is brought under the plate D. The machine is again started, the second sole attached, and at the same time the first sole is finished and shaped by the beating-out form, which is held locked thereon during the four reciprocations of the head A'. The operator has during this operation of the machine placed the third unsoled shoe upon the third last or heel support and then moves it into position beneath the plate D and places the sole. This movement of the third shoe into place brings the first shoe, the sole of which has been beaten out, into position for the attachment of the heel, the second shoe has been brought under the beating-out form or mold, and upon the third starting of the machine three operations proceed upon three different shoes simultaneously. Upon the first shoe the heel-blank, which has been automatically fed and located, is compressed, pricked, attached, top lift applied, if desired, and breasted. The second boot or shoe is submitted to the beating-out operation, and the sole of the third shoe is formed and attached. The operator has in the meanwhile been placing the fourth unsoled shoe upon the fourth last or work-support, and he then moves it into operative position under the sole-attaching plate D. This brings the first jack or work-support again before him, and with the outsole fastened and beaten out and the heel attached and breasted, and he removes the completed shoe and substitutes an unsoled one therefor. The second shoe has been brought into position for the operation of the heel attaching and breasting devices, the third shoe under the beating-out form or mold, and the fourth shoe is in position for the operation of the sole-fastening devices. The machine is then set in operation, and the operation is as last stated, and after this each time that the machine is set in operation the three boots or shoes are operated upon simultaneously.

I would have it understood that I do not limit myself to the specific construction herein described. It is not necessary, in some cases, to use awls for forming holes in the sole, and I therefore can at times dispense with them. Any beating-out mechanism which is the equivalent of that herein described may be employed.

When the outsole is molded by a separate form or mold, it is placed on the last or work-support, which is in front of the operator, and upon the reciprocation of the head it is molded or formed; but I consider, for practical purposes, it is better to mold or form the sole by the plate D.

Having thus fully described my invention, I claim and desire to secure by Letters Patent of the United States—

1. The combination, in a combined sole and heel nailing machine, of a table supporting one or more jacks or work-supports and adapted to move it or them successively to the sole and heel nailing devices with sole-nailing devices adapted to attach an outsole to the upper and insole by a gang or group of nails simultaneously driven, and heel-attaching mechanism adapted to attach a heel to an outsole and insole of a boot or shoe by a gang or group of nails simultaneously driven, constructed and adapted to be operated substantially as described.

2. In a combined sole and heel nailing machine, the combination of mechanism for driving a gang or group of sole nails or fastenings, a sole-beating-out form or mold, devices for driving a gang or group of heel-attaching nails, and one or more jacks or work-supports adapted to be moved in succession to the sole-nailing devices, the beating-out devices, and the heel-attaching devices, constructed and adapted to be operated substantially as described.

3. In a combined sole and heel nailing machine, the combination of a sole-molding device or form, devices for driving a gang or group of sole-fastenings, a sole-beating-out form, devices for driving a gang or group of heel-fastenings, and one or more jacks or work-supports for moving the work successively to said devices, constructed and adapted to be operated substantially as described.

4. The combination, in a combined sole and heel nailing machine, of a sole-nailing templet and devices for driving a gang of sole-fastenings therethrough, a sole-beating-out form for beating-out or forming an attached sole, a heel-nailing templet, and devices for driving a gang of heel-fastenings therethrough with three or more jacks or work-supports arranged for conjoint action with the sole-nailing templet, the beating-out form, and the heel-nailing templet, whereby the three operations of sole-nailing, beating-out, and heel-attaching are simultaneously performed, all constructed and adapted to be operated substantially as described.

5. The combination, in a combined sole and heel nailing machine, of devices for driving a gang of sole-fastenings, a sole-beating-out form or device, and devices for driving a gang of heel-fastenings with four lasts or work-supports mounted upon a movable table and arranged in relation to said sole-nailing, beating-out, and heel-nail-driving devices, to advance the work from one to the other in successive order, constructed and adapted to be operated substantially as described.

6. The combination, in an organized sole and heel nailing machine, of devices for driving a gang or group of sole-fastenings, sole-nail-feeding devices for automatically feeding sole-nails to the sole-nail-driving devices, devices for driving a gang or group of heel-nails, heel-nail-feeding devices for automatically feeding the heel-nails to said heel-nail-driving devices, and two or more jacks or work-supports, constructed and adapted to be operated substantially as described.

7. The combination, in a combined sole and heel nailing machine, of a sole-nailing templet and sole-nailing devices for driving a gang or group of sole-fastenings therethrough, a heel-nailing templet and devices for driving a gang or group of heel-fastenings therefrom, devices for automatically feeding the heel-blanks into position for attachment to the boot or shoe, and one or more jacks or work-supports adapted to be moved from the sole-nailing devices to the heel-nailing devices in advancing the work from the sole-nailing mechanism to the heel-nailing mechanism, all constructed and adapted to be operated substantially as described.

8. In a combined sole and heel nailing machine, the combination of a sole-nailing templet, a device for driving a gang or group of fastenings therefrom, a heel-nailing templet and reciprocating nail-driving devices for driving a gang or group of heel-fastenings therefrom, devices for automatically feeding heel-blanks in successive order into position for attachment to a sole by heel-attaching devices, top-lift-feeding mechanism for automatically feeding top lifts into position for attachment to the heel, and one or more jacks or work-supports adapted to be moved from the sole-nailing to the heel-nailing mechanism, to transfer the work from one set of nailing devices to the other, all constructed and adapted to be operated substantially as described.

9. The combination, in a combined sole and heel nailing machine, of devices for driving a gang or group of sole fastenings, devices for driving a gang or group of heel-fastenings, two or more lasts or work-supports, the main shaft of the machine, and connecting mechanism, substantially as described, whereby upon the starting of the machine the sole-nailing and heel-attaching devices are simultaneously operated, all substantially as described.

10. The combination, in a combined sole and heel nailing machine, of devices for driving a gang or group of sole-fastenings, devices for beating out the attached outsole, devices for driving a gang or group of heel-fastenings, the main shaft of the machine, and connecting mechanism, substantially as described, whereby upon the operation of the machine the sole and heel nail driving devices and the beating-out appliances are simultaneously and automatically operated, all substantially as described.

11. The combination of the cross-head A', supporting the revolving head C C', the sole-nailing templet D, the heel-nailing templet H, two or more jacks or work-supports, the shaft of the machine A², and devices for connecting it with the cross-head A', all substantially as described.

12. The combination of the cross-head A' with the plate or head $g'$, supporting the beating-out form and the sole-molding form, or either, and one or more lasts or work-supports, all substantially as described.

13. The combination of the reciprocating head A', the movable plate or head $g'$, carrying or supporting the beating-out form, and the sole-molding form, or either, with one or more jacks or work-supports, and a latching mechanism for automatically latching the plate or head $g'$ when moved downward to the lowest position, all substantially as described.

14. In a combined sole and heel nailing machine, the combination of the vertically-moving plate $g'$, supporting the beating-out form or mold, the latch for locking it in its lowest position, and devices for automatically unlatching or unlocking it, all substantially as described.

15. The combination of the reciprocating cross-head A', the revolving heads C C', and means for automatically turning the same, the sole-templet D, the heel-templet H, the sole-nail carrier D', the heel-nail carrier H², the main shaft A², the cam-shafts $v\ h'$, the templet and nail carrier cams carried thereby, devices connecting the said cams respectively with the sole-nailing templet and sole-nail carrier and heel-nailing templet and heel-nail carrier, and the main shaft A², all substantially as described.

16. The combination of the reciprocating plate H, having heel-blank-holding devices, and a reciprocating top lift-carrying plate arranged in relation to the plate H, as specified, all substantially as described.

17. The combination of the cross-head, the rod $a$, having the slotted or recessed end M, the reciprocating pitman $a^2$, having the cross-bar or block $m^6$, and the movable block N, all substantially as described.

FREEBORN F. RAYMOND, 2D.

Witnesses:
  J. M. DOLAN,
  FRED. B. DOLAN.